US008426053B2

(12) United States Patent
Lee et al.

(10) Patent No.: US 8,426,053 B2
(45) Date of Patent: Apr. 23, 2013

(54) METHOD FOR MANUFACTURING SEPARATOR INCLUDING POROUS COATING LAYERS, SEPARATOR MANUFACTURED BY THE METHOD AND ELECTROCHEMICAL DEVICE INCLUDING THE SEPARATOR

(75) Inventors: Joo-Sung Lee, Daejeon (KR); Byoung-Jin Shin, Daejeon (KR); Jong-Hun Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/243,091

(22) Filed: Sep. 23, 2011

(65) Prior Publication Data

US 2012/0015254 A1 Jan. 19, 2012

Related U.S. Application Data

(63) Continuation of application No. PCT/KR2010/008296, filed on Nov. 23, 2010.

(30) Foreign Application Priority Data

Nov. 23, 2009 (KR) .................... 10-2009-0113179
Nov. 23, 2010 (KR) .................... 10-2010-0116778

(51) Int. Cl.
*H01M 2/16* (2006.01)
*B05D 3/10* (2006.01)
(52) U.S. Cl.
USPC ..................... 429/144; 429/251; 427/335
(58) Field of Classification Search .................. None
See application file for complete search history.

(56) References Cited

U.S. PATENT DOCUMENTS

| 5,326,598 | A | 7/1994 | Seaver et al. | |
|---|---|---|---|---|
| 7,704,641 | B2 | 4/2010 | Yong et al. | |
| 2002/0110732 | A1* | 8/2002 | Coustier et al. | 429/144 |
| 2006/0008700 | A1* | 1/2006 | Yong et al. | 429/144 |

FOREIGN PATENT DOCUMENTS

| JP | 2008-503049 A | | 1/2008 |
|---|---|---|---|
| KR | 1995-0701248 | | 4/1995 |
| KR | 2006-0111842 A | | 10/2006 |
| KR | 10-2008-0101043 | * | 11/2008 |
| KR | 2008-0101043 A | | 11/2008 |
| KR | 2009-0054385 A | | 5/2009 |
| WO | 2008130175 A1 | | 10/2008 |

* cited by examiner

*Primary Examiner* — Patrick Ryan
*Assistant Examiner* — Muhammad Siddiquee
(74) *Attorney, Agent, or Firm* — Lerner, David, Littenberg, Krumholz & Mentlik, LLP

(57) ABSTRACT

Disclosed is a method for manufacturing a separator. The method includes (S1) preparing a slurry containing inorganic particles dispersed therein and a solution of a binder polymer in a solvent, and coating the slurry on at least one surface of a porous substrate to form a first porous coating layer, and (S2) electroprocessing a polymer solution on the outer surface of the first porous coating layer to form a second porous coating layer. The first porous coating layer formed on at least one surface of the porous substrate is composed of a highly thermally stable inorganic material to suppress short-circuiting between an anode and a cathode even when an electrochemical device is overheated. The second porous coating layer formed by electroprocessing improves the bindability of the separator to other base materials of the electrodes.

23 Claims, 2 Drawing Sheets

METHOD FOR MANUFACTURING SEPARATOR INCLUDING POROUS COATING LAYERS, SEPARATOR MANUFACTURED BY THE METHOD AND ELECTROCHEMICAL DEVICE INCLUDING THE SEPARATOR

CROSS-REFERENCE TO RELATED APPLICATION

This application is a continuation of International Application No. PCT/KR2010/008296 filed Nov. 23, 2010, which claims priority to Korean Patent Application No. 10-2009-0113179 filed in the Republic of Korea on Nov. 23, 2009 and Korean Patent Application No. 10-2010-0116778 filed in the Republic of Korea on Nov. 23, 2010, the entire contents of which are incorporated herein by reference.

TECHNICAL FIELD

The present invention relates to a method for manufacturing a separator for an electrochemical device such as a lithium secondary battery, a separator manufactured by the method, and an electrochemical device including the separator. More particularly, the present invention relates to a method for manufacturing a separator including at least one first porous coating layer containing a mixture of organic and inorganic materials and at least one second porous coating layer formed by electroprocessing a polymer solution, a separator manufactured by the method, and an electrochemical device including the separator.

BACKGROUND ART

Recently, there has been increasing interest in energy storage technologies. As the application fields of energy storage technologies have been extended to mobile phones, camcorders, notebook computers and even electric cars, efforts have increasingly been made towards the research and development of electrochemical devices. Under these circumstances, rechargeable secondary batteries in particular have attracted considerable attention as the most promising electrochemical devices. In recent years, extensive research and development has been conducted to design new electrodes and batteries for the purpose of improving capacity density and specific energy of the batteries.

Many secondary batteries are currently available. Lithium secondary batteries developed in the early 1990's have drawn particular attention due to their advantages of higher operating voltages and much higher energy densities than conventional aqueous electrolyte-based batteries such as Ni—MH batteries, Ni—Cd batteries, and $H_2SO_4$—Pb batteries. However, such lithium ion batteries suffer from safety problems, such as fire or explosion, encountered with the use of organic electrolytes and are disadvantageously complicated to fabricate. In attempts to overcome the disadvantages of lithium ion batteries, lithium ion polymer batteries have been developed as next-generation batteries. More research is still urgently needed to improve the relatively low capacities and insufficient discharge capacities at low temperature of lithium ion polymer batteries in comparison with lithium ion batteries.

Many companies have produced a variety of electrochemical devices with different safety characteristics. It is very important to evaluate and ensure the safety of such electrochemical devices. The most important consideration is that operational failure or malfunction of electrochemical devices should not cause injury to users. For this purpose, regulatory guidelines strictly restrict potential dangers, such as fire and smoke emission, of electrochemical devices. Overheating of an electrochemical device may cause thermal runaway or puncture of a separator may pose an increased risk of explosion. In particular, porous polyolefin substrates commonly used as separators for electrochemical devices undergo severe thermal shrinkage at a temperature of 100° C. or higher on account of their material properties and in view of manufacturing processing including elongation. This thermal shrinkage behavior may cause short-circuiting between a cathode and an anode.

In order to solve the above safety problems of electrochemical devices, a separator has been suggested in which a mixture of excessive inorganic particles and a binder polymer is coated on at least one surface of a highly porous substrate to form a porous coating layer.

The presence of a sufficient amount of the inorganic particles above a predetermined level is a prerequisite for the above-mentioned advantageous functions of the organic-inorganic composite porous coating layer formed on the porous substrate. However, an increase in the content of the inorganic particles, i.e. a decrease in the content of the binder polymer, reduces the bindability of the separator to the electrodes and causes separation of the inorganic particles from the porous coating layer when stress occurs during assembly (e.g., winding) of the electrochemical device or the separator contacts external members. The separated inorganic particles act as local defects of the electrochemical device, giving a negative influence on the safety of the electrochemical device.

Thus, there is a need to develop a method for manufacturing a separator having high bindability and improved ability to prevent separation of inorganic particles.

DISCLOSURE

Technical Problem

The present invention has been made in view of the problems of the prior art separators including a single porous coating layer containing a mixture of organic and inorganic materials, and an object of the invention is to provide a method for manufacturing a separator with improved bindability including at least one first porous coating layer containing a mixture of organic and inorganic materials and at least one second porous coating layer formed by electroprocessing a polymer solution. Another object of the invention is to provide a separator manufactured by the method. Another object of the invention is to provide an electrochemical device including the separator.

Technical Solution

In order to achieve these objects, the present invention provides a method for manufacturing a separator, the method including (S1) preparing a slurry containing inorganic particles dispersed therein and a solution of a binder polymer in a solvent, and coating the slurry on at least one surface of a porous substrate to form a first porous coating layer, and (S2) electroprocessing a polymer solution on the outer surface of the first porous coating layer to form a second porous coating layer.

The porous substrate may be made of a polyolefin.

Preferably, the polyolefin is selected from the group consisting of polyethylene, polypropylene, polybutylene and polypentene.

The inorganic particles may be selected from the group consisting of inorganic particles having a dielectric constant of 5 or above, inorganic particles having the ability to transport lithium ions, and mixtures thereof.

Preferably, the inorganic particles having a dielectric constant of 5 or above are selected from the group consisting of $BaTiO_3$, $Pb(Zr_x,Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3$-$xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$ particles, and mixtures thereof; and the inorganic particles having the ability to transport lithium ions are selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) particles, and mixtures thereof.

The binder polymer may be selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, compounds having a molecular weight of 10,000 g/mol or lower, and mixtures thereof.

The polymer solution may be prepared by melting at least one polymer selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose and compounds having a molecular weight of 10,000 g/mol or lower, or dissolving the polymer in a solvent.

The electroprocessing may be electrospinning or electrospraying.

The present invention also provides a separator including (a) a first porous coating layer formed on at least one surface of a porous substrate and composed of a mixture of inorganic particles and a binder polymer, and (b) a second porous coating layer formed by electroprocessing a polymer solution on the outer surface of the first porous coating layer.

The porous substrate may be made of a polyolefin.

Preferably, the polyolefin is selected from the group consisting of polyethylene, polypropylene, polybutylene and polypentene.

Preferably, the porous substrate has a thickness of 5 to 50 μm, a pore size of 0.01 to 50 μm and a porosity of 10 to 95%.

Preferably, the inorganic particles have an average particle diameter of 0.001 to 10 μm.

The inorganic particles may be selected from the group consisting of inorganic particles having a dielectric constant of 5 or above, inorganic particles having the ability to transport lithium ions, and mixtures thereof.

Preferably, the inorganic particles having a dielectric constant of 5 or above are selected from the group consisting of $BaTiO_3$, $Pb(Zr_x,Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3$-$xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$ particles, and mixtures thereof; and the inorganic particles having the ability to transport lithium ions are selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y\leq2$, $0<z<4$), $P_2S_5$ type glass ($Li_xP_yS_z$, $0<x<3$, $0<y<3$, $0<z<7$) particles, and mixtures thereof.

The binder polymer may be selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, compounds having a molecular weight of 10,000 g/mol or lower, and mixtures thereof.

The polymer solution may be prepared by melting at least one polymer selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose and compounds having a molecular weight of 10,000 g/mol or lower, or dissolving the polymer in a solvent.

The second porous coating layer may be formed by electroprocessing such as electrospinning or electrospraying.

Preferably, the second porous coating layer has a thickness of 0.001 to 5 μm.

The separator of the present invention can be applied to electrochemical devices, such as lithium secondary batteries and supercapacitor devices.

Advantageous Effects

The first porous coating layer formed on at least one surface of the porous substrate is composed of a highly thermally stable inorganic material to suppress short-circuiting between an anode and a cathode even when an electrochemical device is overheated.

The introduction of the second porous coating layer formed by electroprocessing a polymer solution improves the bindability of the separator to other base materials while maintaining the porosity constant, thus ensuring excellent electrochemical device performance. The organic coating layer is formed at the interface with another base material to reduce the content of the organic material for the bindability of the first porous coating layer. This makes it easy to ensure the porosity of the first porous coating layer, contributing to an improvement in the performance of an electrochemical device. In addition, the separator can be prevented from separation of the inorganic particles from the first porous coating layer during handling.

DESCRIPTION OF DRAWINGS

The accompanying drawings illustrate preferred embodiments of the invention and, together with the foregoing disclosure, serve to provide further understanding of the technical spirit of the invention. However, the present invention is not to be construed as being limited to the drawings.

BEST MODE

Figure 1:
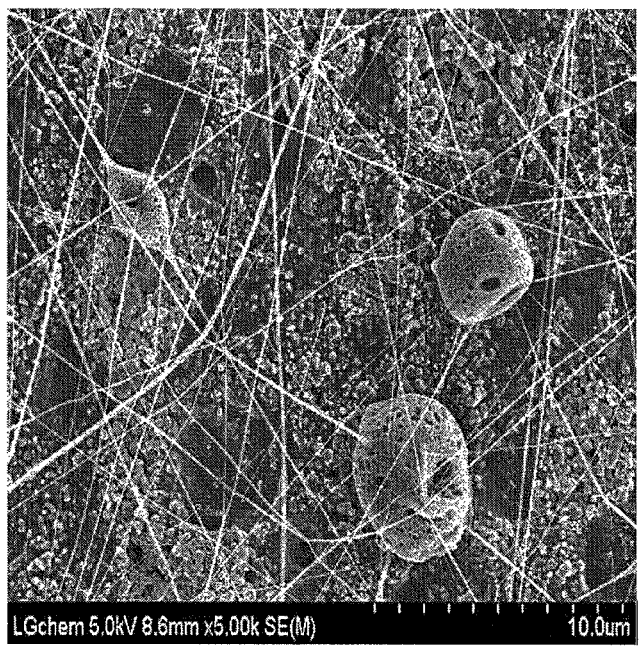
FIG. 1 is a scanning electron microscope (SEM) image showing the surface of a separator manufactured in Example 1 of the present invention.

The present invention will now be described in detail. Prior to the description, it should be understood that terms and words used in the specification and the appended claims are not be construed as having common and dictionary meanings, but should be interpreted as having meanings and concepts corresponding to technical ideas of the present invention in view of the principle that the inventor can properly define the concepts of the terms and words in order to describe his/her own invention with the best method. Therefore, the embodiments described herein are provided for illustrative purposes only and are not intended to limit the technical scope of the invention. As such, it should be understood that other equivalents and modifications could be made thereto at the time of filing the present application.

The present invention provides a method for manufacturing a separator including a first porous coating layer formed on at least one surface of a porous substrate and a second porous coating layer formed on the outer surface of the first porous coating layer. An explanation will be given of the method according to the present invention.

First, a slurry containing inorganic particles dispersed therein and a solution of a binder polymer in a solvent, is prepared. Then, the slurry is coated on at least one surface of a porous substrate to form a first porous coating layer (step S1).

The slurry can be prepared by dissolving a binder polymer in a solvent, adding inorganic particles to the solution, and dispersing the inorganic particles in the solution. The inorganic particles may be crushed to a proper size before addition to the solution of the binder polymer. Preferably, the inorganic particles are added to the solution of the binder polymer and are then dispersed in the solution while being crushed by a suitable technique such as ball milling.

The slurry can be coated on the porous substrate by a technique well-known in the art, for example, dip coating, die coating, roll coating, comma coating, gravure coating and a combination thereof. The slurry may be coated on both surfaces of the porous substrate.

The porous substrate may be any porous planar substrate commonly used in electrochemical devices. Examples of such porous planar substrates include various porous polymer membranes and non-woven fabrics. As the porous polymer membranes, there can be used, for example, porous polyolefin membranes used in separators for electrochemical devices, in particular, lithium secondary batteries. The non-woven fabrics may be, for example, those composed of polyethylene phthalate fibers. The material or shape of the porous substrate may vary according to intended purposes. Examples of suitable materials for the porous polyolefin membranes include polyethylene polymers, such as high density polyethylene, linear low density polyethylene, low density polyethylene and ultrahigh molecular weight polyethylene, polypropylene, polybutylene and polypentene. These polyolefins may be used alone or as a mixture thereof. Examples of suitable materials for the non-woven fabrics include polyolefins and polymers having higher heat resistance than polyolefins. The thickness of the porous substrate is preferably from 1 to 100 μm, more preferably from 5 to 50 μm, but is not particularly limited to this range. The pore size and porosity of the porous substrate are preferably from 0.01 to 50 μm and 10 to 95%, respectively, but are particularly limited to these ranges.

The inorganic particles are not specifically limited so long as they are electrochemically stable. In other words, the inorganic particles can be used without particular limitation in the present invention if they do not undergo oxidation and/or reduction reactions within an operating voltage range applied to an electrochemical device (for example, 0-5 V for Li/Li$^+$). In particular, a high dielectric constant of the inorganic particles can contribute to an increase in the degree of dissociation of salts (e.g., lithium salts) in a liquid electrolyte to improve the ionic conductivity of the electrolyte.

For these reasons, the inorganic particles are preferably those having a dielectric constant of 5 or above, preferably 10 or above. Non-limiting examples of inorganic particles having a dielectric constant of 5 or above include $BaTiO_3$, $Pb(Zr_x,Ti_{1-x})O_3$ (PZT, $0<x<1$), $Pb_{1-x}La_xZr_{1-y}Ti_yO_3$ (PLZT, $0<x<1$, $0<y<1$), (1-x) Pb $(Mg_{1/3}Nb_{2/3})$ $O_3$-$xPbTiO_3$ (PMN-PT, $0<x<1$), hafnia ($HfO_2$), $SrTiO_3$, $SnO_2$, MgO, NiO, CaO, $ZnO_2$, $ZrO_2$, $Y_2O_3$, $Al_2O_3$, $TiO_2$ and SiC particles. These inorganic particles may be used alone or as a mixture of two or more kinds thereof.

The inorganic particles may be those having the ability to transport lithium ions, that is, inorganic particles containing lithium atoms and having the ability to transfer lithium ions without storing the lithium. Non-limiting examples of inorganic particles having the ability to transport lithium ions include lithium phosphate ($Li_3PO_4$) particles, lithium titanium phosphate ($Li_xTi_y(PO_4)_3$, $0<x<2$, $0<y<3$) particles, lithium aluminum titanium phosphate ($Li_xAl_yTi_z(PO_4)_3$, $0<x<2$, $0<y<1$, $0<z<3$) particles, $(LiAlTiP)_xO_y$ type glass ($0<x<4$, $0<y<13$) particles such as $14Li_2O$-$9Al_2O_3$-$38TiO_2$-$39P_2O_5$ particles, lithium lanthanum titanate ($Li_xLa_yTiO_3$, $0<x<2$, $0<y<3$) particles, lithium germanium thiophosphate ($Li_xGe_yP_zS_w$, $0<x<4$, $0<y<1$, $0<z<1$, $0<w<5$) particles such as $Li_{3.25}Ge_{0.25}P_{0.75}S_4$ particles, lithium nitride ($Li_xN_y$, $0<x<4$, $0<y<2$) particles such as $Li_3N$ particles, $SiS_2$ type glass ($Li_xSi_yS_z$, $0<x<3$, $0<y<2$, $0<z<4$) particles such as $Li_3PO_4$—$Li_2S$—$SiS_2$ particles, and $P_2S_5$ type glass ($Li_xP_yS_z$, $0<x<3$, $0<y<3$, $0<z<7$) particles such as LiI—$Li_2S$—$P_2S_5$ particles. These inorganic particles may be used alone or as a mixture of two or more kinds thereof.

There is no particular restriction as to the average particle diameter of the inorganic particles. The average particle diameter of the inorganic particles is preferably limited to the range of 0.001 to 10 μm. This range enables the coating layer to have a uniform thickness and an optimal porosity. An average particle diameter less than 0.001 μm may lead to deterioration in dispersibility. Meanwhile, an average particle diameter exceeding 10 μm may lead to an increase in the thickness of the coating layer.

The binder polymer preferably has a glass transition temperature ($T_g$) between −200° C. and 200° C. Within this range, the mechanical properties (e.g., flexibility and elasticity) of the coating layer can be improved.

The binder polymer does not necessarily need to exhibit ionic conductivity. However, since the ionic conductivity of the binder polymer can further improve the performance of an electrochemical device, it is preferred that the binder polymer has a dielectric constant as high as possible. In practice, the degree of dissociation of salts in an electrolyte is dependent on the dielectric constant of a solvent used in the electrolyte. Therefore, a higher dielectric constant of the binder polymer can lead to a higher degree of dissociation of salts in an electrolyte. The dielectric constant of the binder polymer is in the range between 1.0 and 100 (as measured at a frequency of 1 kHz), particularly preferably 10 or above.

Further, impregnation of the binder polymer with a liquid electrolyte allows the binder polymer to be gelled, resulting in a high degree of swelling of the binder polymer. For a high degree of swelling, the binder polymer preferably has a solubility parameter between 15 and 45 $Mpa^{1/2}$, more preferably between 15 and 25 $Mpa^{1/2}$ and between 30 and 45 $Mpa^{1/2}$. Accordingly, a hydrophilic polymer having many polar groups is preferred as the binder polymer over a hydrophobic polymer such as a polyolefin. A solubility parameter less than 15 $Mpa^{1/2}$ or exceeding 45 $Mpa^{1/2}$ makes it difficult to swell the binder polymer in a typical liquid electrolyte for a battery.

Non-limiting examples of such binder polymers include polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, and compounds having a molecular weight of 10,000 g/mol or lower.

The weight ratio of the inorganic particles to the binder polymer is preferably from 50:50 to 99:1, more preferably from 70:30 to 95:5. The use of the inorganic particles in an amount of less than 50% by weight (i.e. in an amount less than that of the binder polymer) may reduce the pore size and porosity of the coating layer. Meanwhile, the use of the inorganic particles in an amount exceeding 99% by weight may deteriorate the peeling resistance of the coating layer.

The solvent used to dissolve the binder polymer preferably has a solubility parameter similar to that of the binder polymer and a low boiling point, which are advantageous for uniform mixing and ease of solvent removal. Non-limiting examples of solvents usable to dissolve the binder polymer include acetone, tetrahydrofuran, methylene chloride, chloroform, dimethylformamide, N-methyl-2-pyrrolidone (NMP), cyclohexane and water. These solvents may be used alone or as a mixture thereof.

Subsequently, a polymer solution is electroprocessed on the outer surface of the first porous coating layer to form a second porous coating layer (step S2).

Any polymer solution capable of forming a porous coating layer by electroprocessing may be used without limitation. It is to be understood that the polymer solution includes a solution of an appropriate amount of a polymer in a solvent for solution electroprocessing and a molten solution of a polymer without using a solvent for melt-electroprocessing.

The polymer solution is preferably prepared by melting at least one polymer selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose and compounds having a molecular weight of 10,000 g/mol or lower, or dissolving the polymer in a solvent.

The solvent preferably has a solubility parameter similar to that of the polymer and a low boiling point, which are advantageous for uniform mixing and ease of solvent removal. Non-limiting examples of solvents usable in the present invention acetone, tetrahydrofuran, methylene chloride, chloroform, dimethylformamide, N-methyl-2-pyrrolidone (NMP), cyclohexane and water. These solvents may be used alone or as a mixture thereof.

Methods for electroprocessing polymer solutions are well known in the art. Electroprocessing is a technique in which a solution is charged by applying a high voltage thereto and is electroprocessed onto a substrate through an injection nozzle having a fine diameter or a spray head generating droplets. Electroprocessing includes electrospinning and electrospraying. Korean Unexamined Patent Publication No. 2009-0054385 discloses a method for electrospinning a solution by using an electrospinning apparatus including a syringe pump, needles, a stainless steel drum as a bottom electrode whose rotational speed is controllable and a spinning voltage supplier in which the intervals between the tips of the needles and the drum are adjusted to 5-30 cm, the spinning voltage is adjusted to at least 15 kV and the flow rate of the solution from the syringe pump is adjusted to 1-20 ml/hr. Further, details of an electrospraying apparatus and method are described in Korean Patent Registration No. 0271116. These publications are incorporated herein by reference.

According to the method of the present invention, the porous substrate is placed on a base of an electroprocessing apparatus and the polymer solution is electroprocessed on the outer surface of the first porous coating layer formed on at least one surface of the porous substrate to form the second porous coating layer. The intervals between the needles, the speed at which the base moves, etc. are controlled by known methods to optimize the porosity of the coating layer. Electroprocessing includes electrospinning and electrospraying.

The polymer solution is applied in the form of nanofibers or nanodrops by electroprocessing. Preferably, the nanofibers have a diameter of 1 to 200 nm and the nanodrops have an elliptical shape with a short diameter of 10 to 500 nm.

The present invention also provides a separator manufactured by the method. The separator includes (a) a first porous coating layer formed on at least one surface of a porous substrate and composed of a mixture of inorganic particles and a binder polymer, and (b) a second porous coating layer formed by electroprocessing a polymer solution on the outer surface of the first porous coating layer.

In the first porous coating layer, the inorganic particles are fixedly connected to each other by the binder polymer and interstitial volumes created between the inorganic particles form pores. That is, the binder polymer attaches (that is, fixedly connects) the inorganic particles to each other so as to maintain a state in which the inorganic particles are bound to each other. Another function of the binder polymer is to maintain a state in which the first porous coating layer is bound to the porous substrate. In the first porous coating layer, the inorganic particles are in substantial contact with each other and have a closest packed structure. Interstitial volumes created between the inorganic particles in contact with each other become pores of the first porous coating layer.

The second porous coating layer is preferably composed of at least one polymer selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethyleneco-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, and compounds having a molecular weight of 10,000 g/mol or lower.

The second porous coating layer formed by electroprocessing is composed of organic fibers. There is no particular restriction as to the shape of the second porous coating layer. The second porous coating layer is preferably in the form of a fine porous film composed of nanofibers or nanodrops. Generally, a porous coating layer formed by electrospinning is composed of organic fibers in the form of relatively long nanofibers, whereas a porous coating layer formed by electrospraying is composed of organic fibers in the form of relatively short nanodrops. In the second porous coating layer, the organic fibers are connected to each other to form networks. However, the second porous coating layer may also be composed of organic fibers in the form of nanodrops by adjustment of the operational conditions of electrospinning. Preferably, the nanofibers have a diameter of 1 to 200 nm and the nanodrops have an elliptical shape with a short diameter of 10 to 500 nm.

The particle diameter of the organic fibers can be controlled to the nanometer range to improve the bindability of the fibrous organic material and maintain the porosity of the porous coating layer, ensuring good battery performance. The thickness of the second porous coating layer is preferably in the range of 0.001 to 5 μm. Within this range, good bindability is achieved while minimizing the influence on the performance of a battery. Preferably, the second porous coating layer has an average pore size of 0.01 to 50 μm and a porosity of 1 to 90%.

The separator having a functional multilayer structure according to the present invention can be interposed between an anode and a cathode, like conventional separators. Due to this construction, the first porous coating layer composed of the inorganic material prevents short-circuiting between the anode and the cathode even upon overheating.

The present invention also provides an electrochemical device including the separator. The electrochemical device of the present invention may be any device in which electrochemical reactions occur. Specific examples of such electrochemical devices include all kinds of primary batteries, secondary batteries, fuel cells, solar cells, and capacitors such as supercapacitor devices. Particularly preferred are lithium secondary batteries, including lithium metal secondary batteries, lithium ion secondary batteries, lithium polymer secondary batteries and lithium ion polymer secondary batteries.

The electrochemical device of the present invention may optionally use a solution of a salt in an organic solvent as an electrolyte. For example, the salt can be represented by $A^+B^-$ wherein $A^+$ represents an alkali metal cation such as $Li^+$, $Na^+$, $K^+$ or a combination thereof and $B^-$ represents an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof. Examples of suitable organic solvents include, but are not limited to, propylene carbonate (PC), ethylene carbonate (EC), diethyl carbonate (DEC), dimethyl carbonate (DMC), dipropyl carbonate (DPC), dimethylsulfoxide, acetonitrile, dimethoxyethane, diethoxyethane, tetrahydrofuran, N-methyl-2-pyrrolidone (NMP), ethyl methyl carbonate (EMC) and γ-butyrolactone. These organic solvents may be used alone or as a mixture thereof.

The electrolyte may be injected in any suitable step during manufacture of the electrochemical device depending on the manufacturing processes and desired physical properties of a final product. In other words, the electrolyte may be injected before assembly of the battery or in the final step of battery assembly.

MODE FOR INVENTION

Hereinafter, the present invention will be explained in detail with reference to embodiments. The embodiments of the present invention, however, may take several other forms, and the scope of the invention should not be construed as being limited to the following examples. The embodiments of the present invention are intended to more comprehensively explain the present invention to those skilled in the art.

EXAMPLES

Example 1

18 wt % of a mixture of $Al_2O_3$ and $BaTiO_3$ (9:1) as an inorganic material and 2 wt % of a mixture of polyvinylidene fluoride-hexafluoropropylene (PVdF-HFP) and cyanoethyl polyvinyl alcohol (9:1) as an organic material were dissolved in acetone to prepare a slurry. The slurry was coated on both surfaces of a polyolefin film (312HT, SK Energy) and dried to form 3 μm thick first porous coating layers. Thereafter, 6 wt % of polyvinylidene fluoride-hexafluoropropylene was electrospun at 5 kV and a rate of 50 mL/min through a syringe pump on the first porous coating layers to form second porous coating layers in the form of fibers having a diameter of 50-100 nm, completing the manufacture of a separator. The separator had a Gurley value of 372.7 sec/100 mL, which is a level suitable for good battery performance, and a bonding strength of 7.00 gf/cm, which is a sufficient value for battery assembly.

Example 2

A separator was manufactured in the same manner as in Example 1, except that second porous coating layers were formed by electrospraying at 15 kV instead of electrospinning at 5 kV. The second porous coating layers were in the form of nanodrops having a size of 100-300 nm based on the short diameter. The separator had a Gurley value of 383.5 sec/100 mL, which is a level suitable for good battery performance, and a bonding strength of 6.89 gf/cm, which is a sufficient value for battery assembly.

Comparative Example 1

18 wt % of a mixture of $Al_2O_3$ and $BaTiO_3$ (9:1) as an inorganic material and 2 wt % of a mixture of polyvinylidene fluoride-hexafluoropropylene (PVdF-HFP) and cyanoethyl polyvinyl alcohol (9:1) as an organic material were dissolved in acetone to prepare a slurry. The slurry was coated on both surfaces of a polyolefin film (312HT, SK Energy) and dried to form 3 μm thick first porous coating layers, completing the manufacture of a separator.

The inorganic material was observed on the surfaces of the first porous coating layers. The separator had a Gurley value of 370.8 sec/100 mL, which is a level suitable for good battery performance. The bonding strength of the separator was 1.84 gf/cm, a value at which battery assembly is not possible.

Test Example 1

Figure 2:
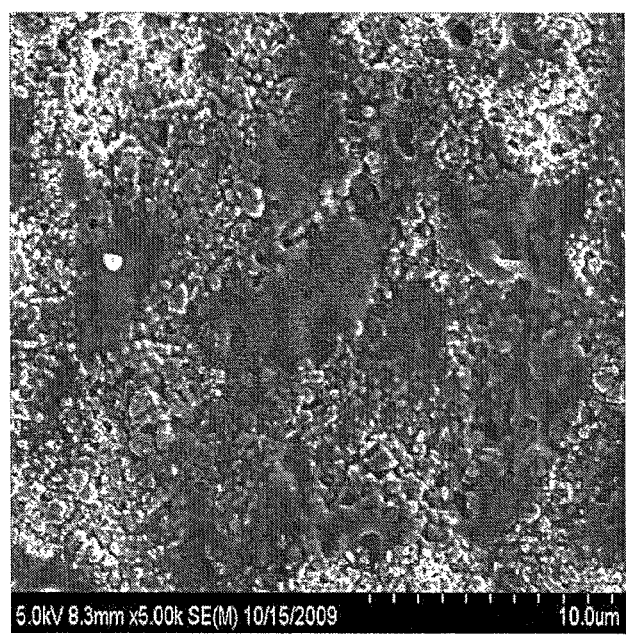
FIG. 2 is a scanning electron microscope (SEM) image showing the surface of a separator manufactured in Example 2 of the present invention.
Figure 3:
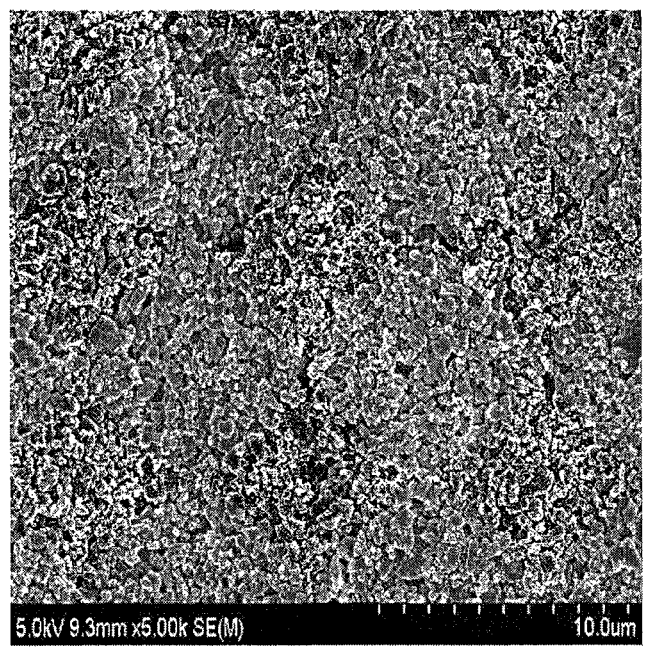
FIG. 3 is a scanning electron microscope (SEM) image showing the surface of a separator manufactured in Comparative Example 1 of the present invention.

The surfaces of the separators manufactured in Examples 1-2 and Comparative Example 1 were observed under a scanning electron microscope (SEM), and their images are shown in FIGS. 1-3. The images reveal that the inorganic particles were directly exposed in the separator of Comparative Example 1, unlike in the separators of Examples 1-2.

What is claimed is:

1. A method for manufacturing a separator, comprising
   (S1) preparing a slurry containing inorganic particles dispersed therein and a solution of a binder polymer in a solvent, and coating the slurry on at least one surface of a porous substrate to form a first porous coating layer, and
   (S2) electroprocessing a polymer solution on the outer surface of the first porous coating layer to form a second porous coating layer, wherein air permeability of the separator after forming the first porous coating layer and after forming the second porous coating layer remains substantially constant, and,
   wherein the polymer solution consists of 1) a polymer in a solvent or 2) a molten solution of a polymer.

2. The method according to claim 1, wherein the porous substrate is made of a polyolefin.

3. The method according to claim 2, wherein the polyolefin is selected from the group consisting of polyethylene, polypropylene, polybutylene and polypentene.

4. The method according to claim 1, wherein the inorganic particles are selected from the group consisting of inorganic particles having a dielectric constant of 5 or above, inorganic particles having the ability to transport lithium ions, and mixtures thereof.

5. The method according to claim 4, wherein the inorganic particles having a dielectric constant of 5 or above are selected from the group consisting of $BaTiO_3$, $Pb(Zr_x,Ti_{1-x})O_3$ (PZT, $0<x<1$), $Pb_{1-x}La_xZr_{1-y}Ti_yO_3$ (PLZT, $0<x<1$, $0<y<1$), $(1-x) Pb(Mg_{1/3}Nb_{2/3})O_3-xPbTiO_3$ (PMN-PT, $0<x<1$) hafnia ($HfO_2$) $SrTiO_3$, $SnO_2$, $CeO_2$, $MgO$, $NiO$, $CaO$, $ZnO$, $ZrO_2$, $SiO_2$, $Y_2O_3$, $Al_2O_3$, $SiC$, $TiO_2$ particles, and mixtures thereof.

6. The method according to claim 4, wherein the inorganic particles having the ability to transport lithium ions are selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) particles, and mixtures thereof.

7. The method according to claim 1, wherein the binder polymer is selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, compounds having a molecular weight of 10,000 g/mol or lower, and mixtures thereof.

8. The method according to claim 1, wherein the polymer solution is prepared by melting at least one polymer selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose and compounds having a molecular weight of 10,000 g/mol or lower, or dissolving the polymer in a solvent.

9. The method according to claim 1, wherein the electroprocessing is electrospinning or electrospraying.

10. A separator comprising
    (a) a first porous coating layer formed on at least one surface of a porous substrate and composed of a mixture of inorganic particles and a binder polymer, and
    (b) a second porous coating layer formed by electroprocessing a polymer solution on the outer surface of the first porous coating layer, wherein air permeability of the separator after forming the first porous coating layer and after forming the second porous coating layer remains substantially constant, and,
    wherein the polymer solution consists of 1) a polymer in a solvent or 2) a molten solution of a polymer.

11. The separator according to claim 10, wherein the porous substrate is made of a polyolefin.

12. The separator according to claim 11, wherein the polyolefin is selected from the group consisting of polyethylene, polypropylene, polybutylene and polypentene.

13. The separator according to claim 10, wherein the porous substrate has a thickness of 5 to 50 μm, a pore size of 0.01 to 50 μm and a porosity of 10 to 95%.

14. The separator according to claim 10, wherein the inorganic particles have an average particle diameter of 0.001 to 10 μm.

15. The separator according to claim 10, wherein the inorganic particles are selected from the group consisting of inorganic particles having a dielectric constant of 5 or above, inorganic particles having the ability to transport lithium ions, and mixtures thereof.

16. The separator according to claim 15, wherein the inorganic particles having a dielectric constant of 5 or above are selected from the group consisting of $BaTiO_3$, $Pb(Zr_x,Ti_{1-x})O_3$ (PZT, $0<x<1$), $Pb_{1-x}La_xZr_{1-y}Ti_yO_3$ (PLZT, $0<x<1$, $0<y<1$), $(1-x) Pb(Mg_{1/3}Nb_{2/3})O_3-xPbTiO_3$ (PMN-PT, $0<x<1$), hafnia ($HfO_2$) $SrTiO_3$, $SnO_2$, $CeO_2$, $MgO$, $NiO$, $CaO$, $ZnO$, $ZrO_2$, $SiO_2$, $Y_2O_3$, $Al_2O_3$, $SiC$, $TiO_2$ particles, and mixtures thereof.

17. The separator according to claim 15, wherein the inorganic particles having the ability to transport lithium ions are selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) particles, and mixtures thereof.

18. The separator according to claim 10, wherein the binder polymer is selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, compounds having a molecular weight of 10,000 g/mol or lower, and mixtures thereof.

19. The separator according to claim 10, wherein the polymer solution is prepared by melting at least one polymer selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose and compounds having a molecular weight of 10,000 g/mol or lower, or dissolving the polymer in a solvent.

20. The separator according to claim 10, wherein the electroprocessing is electrospinning or electrospraying.

21. The separator according to claim 10, wherein the second porous coating layer has a thickness of 0.001 to 5 μm, a pore size of 0.01 to 50 μm and a porosity of 1 to 90%.

22. An electrochemical device comprising a cathode, an anode and the separator according to claim 10 interposed between the cathode and the anode.

23. The electrochemical device according to claim 22, wherein the electrochemical device is a lithium secondary battery.

* * * * *